Figure 1A:
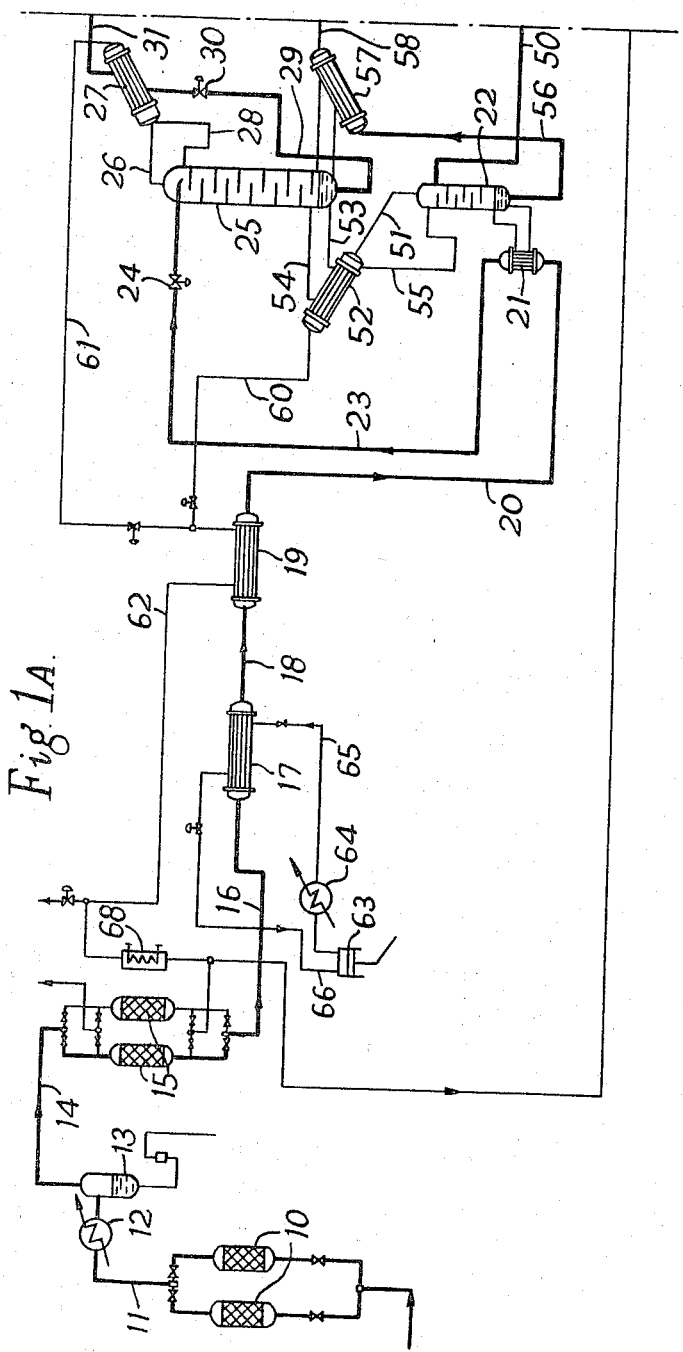

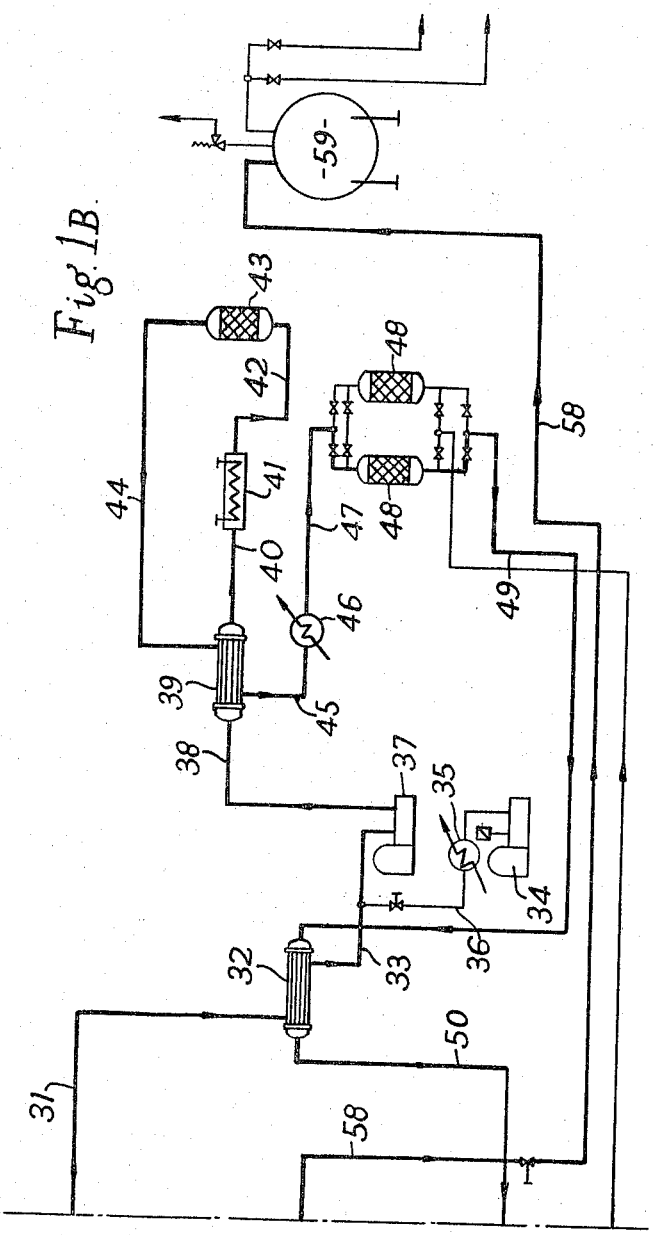

United States Patent Office 3,317,278
Patented May 2, 1967

3,317,278
PURIFICATION OF CARBON DIOXIDE
Martin Siegfried William Ruhemann, Brooklands, Sale, and Peter Halford, Peel Hall, Manchester, England, assignors to Petrocarbon Development Limited, London, England, a British company
Filed Nov. 26, 1963, Ser. No. 325,988
4 Claims. (Cl. 23—150)

This invention relates to the purification of carbon dioxide containing a minor proportion of impurities including light hydrocarbons.

Such an impure carbon dioxide is available from natural sources. This impure carbon dioxide is usually available at pressures above 1000 p.s.i., and contains as impurities small quantities of nitrogen, argon and light hydrocarbons, primarily methane, ethane, propane and butane, though hydrocarbons containing up to 8 carbon atoms may be present. It may also contain moisture and traces of oil.

Any traces of oil and any moisture or water vapour present in the impure carbon dioxide may be removed by conventional methods. Thus the oil may be removed by filtration and the moisture by condensation and treatment with a dehydrating agent.

Of the remaining impurities which may be present in the impure carbon dioxide as mentioned above, nitrogen, argon, and methane are more volatile than carbon dioxide and can therefore be removed as overhead products from a single distillation column. Ethane, which is less volatile than carbon dioxide, forms an azeotrope with it and therefore behaves at low concentrations as if it were more volatile than carbon dioxide. Ethane can therefore also be removed, together with methane and nitrogen, as an overhead product from the same distillation column and is accordingly regarded herein as an impurity more volatile than carbon dioxide. Butane is less volatile than carbon dioxide and may therefore, in principle, be removed as a bottoms product in a separate, second distillation column, as may be hydrocarbons heavier than butane. However, propane, the boiling point of which lies between that of ethane and that of butane and which is itself less volatile than carbon dioxide, shows such a vapour-liquid equilibrium in association with carbon dioxide that, at low concentration, its apparent volatility is the same as that of carbon dioxide. Thus the complete separation of carbon dioxide and propane cannot readily be effected by distillation alone.

Hydrocarbons which are present in small quantities in inert gases may be removed by oxidation in air or oxygen over certain catalysts. It has been found that these catalytic oxidation reactions proceed more easily with the heavier hydrocarbons, such as propane, butane and pentane, than with the lighter hydrocarbons, ethane and methane. In particular, it has been found that the temperatures required for the catalytic oxidation of ethane and methane are higher than those required for the oxidation of propane and higher hydrocarbons. Thus, if carbon dioxide containing all the above hydrocarbons as impurities is conducted over a catalyst in the presence of air, there will be a tendency for the heavier hydrocarbons to be completely removed while the lighter hydrocarbons will be only partially oxidized. In order to ensure the complete removal of all the hydrocarbons, it is necessary to conduct the reaction at an inconveniently high temperature. Moreover, the oxidation reactions themselves, which result in the formation of carbon dioxide and water vapour, proceed exothermally so that, if they are initiated at a sufficiently high temperature to ensure complete oxidation, they may lead, as a result of the reactions themselves, to temperatures so high as to be dangerous to the catalyst.

It is an object of the invention to produce from an impure carbon dioxide of the nature indicated above, highly pure carbon dioxide, suitable for use by the nuclear power industry and by the food industry.

This invention consists in a process for purifying carbon dioxide contaminated with a minor proportion of gaseous impurities, including light hydrocarbons, in which the impure carbon dioxide is, after removal of any traces of oil and after drying, if necessary, first rectified at a low temperature and an elevated pressure, part of the gaseous impurities being removed as an overhead fraction from the first rectification; the remaining impurities and carbon dioxide forming the bottoms fraction are passed through a catalytic oxidation zone at an elevated temperature so as to oxidize the remaining hydrocarbon impurities, and the resulting gas is, after drying, rectified again at a low temperature and elevated pressure, further impurities being removed as an overhead fraction from the second rectification.

This invention also consists in gas purification apparatus comprising two high pressure, low temperature rectification columns with fluid conveying means between the sump of the first column and the head of the second column, a catalytic oxidation reactor inserted in the fluid conveying means between the two columns, heating means between the sump of the first column and the oxidation reactor for heating fluid passing through the fluid conveying means and means for introducing air at an elevated pressure into the fluid stream which passes through the oxidation reactor.

The distillation or rectification of carbon dioxide containing the above mentioned impurities has to be carried out at temperatures below ambient temperature because of the low critical temperatures of carbon dioxide and of some of the impurities. The provision of reflux in the distillation columns therefore requires a supply of refrigeration.

The carbon dioxide, when it is available at a high pressure can itself be made to supply at least a part of this refrigeration, without the expenditure of mechanical work, by allowing the carbon dioxide to expand to a lower pressure. Thus, according to one embodiment of the invention at least a part of the refrigeration required to enable the distillation to be carried out at temperatures below ambient temperature is supplied by expansion of the carbon dioxide itself, leading to a substantial drop in temperature.

A preferred embodiment of the invention consists in operating the second rectification column at a higher pressure than the first column and passing the impure carbon dioxide, after drying and preliminary cooling, at a high pressure through the reboiler of the second rectification column, thus providing re-boil in that column, prior to feeding it after expansion to a lower pressure with a consequent reduction in temperature and liquefaction into the first rectification column; using the reflux condenser of the second column as a reboiler for the first column; providing additional re-boil in the first column by cooling the bottoms product of the second column in an auxiliary reboiler in indirect heat exchange with the liquid in the sump of the first column, and providing reflux for the first column by allowing its liquid bottoms product, after expansion to a lower pressure, with a consequent reduction in temperature, to evaporate in indirect heat exchange with the overhead vapour from the first column.

A preferred form of this embodiment consists in withdrawing from the first column a liquid bottoms product, from which nitrogen, methane and most of the ethane have been removed, evaporating it in the reflux condenser of that column, compressing it to a higher pressure, heating it, injecting a measured quantity of air under pressure into it, passing the resulting mixture, after further heating if required, over an oxidation catalyst for conversion of heavier hydrocarbons and residual ethane into carbon dioxide and water vapour, cooling and drying the resulting moist carbon dioxide stream and feeding it to the second rectification or distillation column, which operates at a higher pressure than the first and in which the nitrogen from the injected air and any residual oxygen are removed as overhead product, pure carbon dioxide being withdrawn from the base of the second column as a liquid and being sub-cooled in the auxiliary reboiler of the first column as mentioned above.

The invention is illustrated, by way of example, in the following description with reference to the accompanying drawing, which is a diagrammatic view of an apparatus according to this invention, shown as FIGS. 1a and 1b.

Impure moist carbon dioxide from a natural source, entering the apparatus at 1440 p.s.i.a. and 35° C. contains the following impurities:

| | Percent |
|---|---|
| Nitrogen | 1 |
| Methane | 1.7 |
| Ethane | 0.05 |
| Propane | 0.03 |
| Butane | 0.01 |
| and Argon | 0.002 |

The carbon dioxide may also contain traces of oil up to 0.1%.

The critical pressure of carbon dioxide is 1078 p.s.i.a. and its critical temperature is 31° C. The impure carbon dioxide thus enters the plant at a pressure above the critical pressure and at a temperature above the critical temperature. Hence although it may suitably be described as a gas under these conditions, it will on subsequent cooling at a substantially constant pressure assume the properties associated with a liquid without any discontinuous change of phase.

The impure carbon dioxide enters the plant through one of the two interchangeable filters 10, in which traces of oil are removed, thence flows via line 11 through the water cooler 12, in which some water vapour condenses out and the water separator 13, and thence via line 14 to one of the two interchangeable driers 15.

The dry crude carbon dioxide leaving the drier 15 is passed via line 16 to the evaporator 17 in which it is further cooled to 6° C. by indirect heat exchange with Arcton 12 evaporating in the evaporator 17. It is then passed via line 18 to the heat exchanger 19, in which it is still further cooled by indirect heat exchange with returning waste gas and thence flows via line 20 into the reboiler 21 of the second rectification column 22, in which reboiler it is cooled to −12° C. in indirect heat exchange with the bottoms product of that column.

The crude carbon dioxide leaves the reboiler 21 via line 23, is expanded through valve 24 to 190 p.s.i.a., as a result of which its temperature falls to −33° C. and it is liquefied (forming liquid in contact with a vapour phase), and it is then fed onto the top tray of the first rectification column 25. The nitrogen, argon and methane impurities, together with most of the ethane are removed from the column 25 as an overhead fraction via line 26, passing through the reflux condenser 27, with reflux returning via line 28. The carbon dioxide, together with the remainder of the ethane and the propane and butane, is removed from the column 25 as a liquid bottoms fraction via line 29, and, after expansion through valve 30 to 130 p.s.i.a. is evaporated in indirect heat exchange with the overheads fraction in the reflux condenser 27, so as to condense part of the overheads and provide reflux for the column 25.

The gaseous, partially purified carbon dioxide leaving the reflux condenser 27 via line 31 is then heated to 5° C. in the counter-current heat exchanger 32 which it leaves via line 33. A measured quantity of air from the air compressor 34 passing through after-cooler 35 and line 36 is injected into the partially purified carbon dioxide stream in line 33 and the mixture passed to the compressor 37 in which it is compressed to 380 p.s.i.a. The compressed gas mixture is then passed via line 38 to the counter-current heat exchanger 39 in which it is heated to 390° C. and thence via line 40 to the electric heater 41 in which it is further heated to 400° C. The gas mixture leaving heater 41 is passed via line 42 to the catalytic reactor 43. In the catalytic reactor 43 the ethane, propane and butane are oxidized by the oxygen in the injected air to form carbon dioxide and water. The carbon dioxide leaving the reactor 43, which now contains nitrogen, argon, unreacted oxygen and water vapour as impurities is passed via line 44 to the counter-current heat exchanger 39, through which it passes in indirect heat exchange relationship with incoming gas, and thence via line 45 to the water cooler 46 which it leaves at 25° C. It then passes via line 47 through one of the two interchangeable driers 48 and thence via line 49 through heat exchanger 32 in which it is further cooled. It is then fed through line 50 to the top tray of the second rectification column 22.

Carbon dioxide vapour containing the nitrogen, argon and oxygen impurities leaves the head of the column 22 as an overhead fraction via line 51 and enters the reflux condenser 52, where most of the carbon dioxide is condensed by indirect heat exchange with impure liquid carbon dioxide entering via line 53 from the sump of the column 25, and returning to column 25, after evaporation, via line 54. The carbon dioxide condensed from the overhead fraction of column 22 in reflux condenser 52 returns to column 22 via line 55. Thus the condenser 52 provides reflux for the column 22 and at the same time acts as a reboiler for the column 25.

Pure carbon dioxide is collected as a liquid in the sump of the column 22, in which it is heated by the reboiler 21. The liquid carbon dioxide is withdrawn from the sump of the column 22 at −15° C. and is passed via line 56 through the cooler (or auxiliary reboiler) 57, in which it is cooled to −30° C. in indirect heat exchange with liquid in the sump of the column 25, thereby providing further reboil for that column. The liquid carbon dioxide leaving the cooler 57 is fed via line 58 to the storage tank 59 at −30° C. and about 300 p.s.i.a.

The gaseous impurities leaving the reflux condensers 52 and 27 via lines 60 and 61 respectively are combined, are passed through the heat exchanger 19, where they cool the incoming impure carbon dioxide by indirect heat exchange, and are vented to the atmosphere via line 62. Part or all of these impurities may be diverted through the electric heater 68 and used to regenerate the driers 15 and 48 when they are spent.

The cooled liquid Arcton for the evaporator 17 is supplied by the compressor 63 and after-cooler 64 through line 65, and is recycled from the evaporator 17 to the compressor 63 through line 66.

The oxidation catalyst used for the oxidation in reactor 43 may suitably be an alumina-supported palladium or platinum oxidation catalyst.

Filters 10, in which traces of oil are removed, may suitably comprise a number of ceramic filter elements of continuously decreasing pore size.

The driers 15 and 48 may suitably be packed with synthetic zeolite or activated alumina.

We claim:
1. A process for the purification of impure carbon dioxide contaminated with gaseous impurities, including light hydrocarbons, which process comprises distilling the impure carbon dioxide, after removal of any traces of oil and any moisture present, in a first distillation step at a superatmospheric pressure and at a temperature below ambient temperature, at which it is essentially liquid, sufficient to remove the more volatile impurities as an overhead fraction and obtain a liquid bottoms fraction, removing and vaporizing said liquid bottoms fraction, introduc- ing molecular oxygen into said vaporized bottoms fraction in an amount sufficient to oxidize the remaining hydrocarbon impurities and subjecting the resulting mixture of oxygen and vaporized bottoms fraction to catalytic oxidation at a superatmospheric pressure and an elevated temperature sufficient to oxidize said remaining hydrocarbon impurities, drying and cooling the effluent from the catalytic oxidation to below ambient temperature to substantially liquefy it, and distilling said liquefied effluent in a second distillation step at a superatmospheric pressure sufficient to remove the inorganic impurities then present as an overhead fraction and recovering substantially pure carbon dioxide as the bottoms fraction of said second distillation step.

2. A process as claimed in claim 1, in which the impure carbon dioxide is available at a highly elevated pressure and part of the refrigeration required to enable the distillation steps to be carried out at low temperatures is provided by expansion of said carbon dioxide to a lower pressure.

3. A process as claimed in claim 1, in which
 (a) the second distillation step is carried out at a higher pressure than the first distillation step;
 (b) the impure carbon dioxide at an elevated pressure is cooled in providing re-boil for said second distillation step, and then expanded to a lower pressure, with a consequent reduction in temperature and liquefaction, and fed to said first distillation step;
 (c) the overhead fraction from said second distillation step is cooled by indirect heat exchange with the liquid bottoms fraction of said first distillation step, thus providing reflux for said second distillation step and re-boil for said first distillation step;
 (d) the liquid bottoms fraction from said second distillation step is withdrawn and sub-cooled by indirect heat exchange with said liquid bottoms fraction of said first distillation step, thus providing additional re-boil for said first distillation step; and
 (e) said liquid bottoms fractions of said first distillation step is expanded and then vaporized by indirect heat exchange with the overhead fraction of said first distillation step, thus providing reflux for said first distillation step.

4. A process as claimed in claim 3, in which the vaporized bottoms fraction from the first distillation step is heated, mixed with air, and, after being further compressed and heated to the required pressure and temperature for oxidation, passed through a catalytic oxidation zone to catalytically oxidize the residual hydrocarbons therein, and in which the effluent from said catalytic oxidation zone is, after preliminary cooling and after drying, cooled further in indirect heat exchange with said vaporized bottoms fraction, prior to mixing of the latter with air, and fed to the second distillation step.

References Cited by the Examiner

UNITED STATES PATENTS 2,999,008  9/1961  Diebold _____ 23—150

FOREIGN PATENTS 635,729  1/1962  Canada.

OSCAR R. VERTIZ, *Primary Examiner.*

J. J. BROWN, A. J. GREIF, *Assistant Examiners.*